(12) United States Patent
Wong et al.

(10) Patent No.: US 10,075,878 B2
(45) Date of Patent: Sep. 11, 2018

(54) MULTIPLE-INPUT-MULTIPLE-OUTPUT (MIMO) COMMUNICATION

(71) Applicant: Alcatel Lucent, Boulogne Billancourt (FR)

(72) Inventors: Shin Horng Wong, Swindon (GB); Matthew Baker, Swindon (GB)

(73) Assignee: ALCATEL LUCENT, Boulogne Billancourt (FR)

( * ) Notice: Subject to any disclaimer, the term of this patent is extended or adjusted under 35 U.S.C. 154(b) by 0 days.

(21) Appl. No.: 14/400,053

(22) PCT Filed: Mar. 7, 2013

(86) PCT No.: PCT/EP2013/000667
§ 371 (c)(1),
(2) Date: Nov. 10, 2014

(87) PCT Pub. No.: WO2013/167213
PCT Pub. Date: Nov. 14, 2013

(65) Prior Publication Data
US 2015/0146811 A1 May 28, 2015

(30) Foreign Application Priority Data
May 10, 2012 (EP) .................................... 12360036

(51) Int. Cl.
*H04B 7/02* (2018.01)
*H04W 28/18* (2009.01)
*H04B 7/0413* (2017.01)
*H04L 12/911* (2013.01)

(52) U.S. Cl.
CPC .......... *H04W 28/18* (2013.01); *H04B 7/0413* (2013.01); *H04L 47/74* (2013.01)

(58) Field of Classification Search
None
See application file for complete search history.

(56) References Cited

U.S. PATENT DOCUMENTS

| | | |
|---|---|---|
| 6,862,271 B2 | 3/2005 | Medvedev et al. |
| 2011/0080972 A1 | 4/2011 | Xi et al. |

FOREIGN PATENT DOCUMENTS

| | | |
|---|---|---|
| JP | 2009-519674 A | 5/2009 |
| RU | 2007 139 587 A | 4/2009 |
| WO | WO 2012/022010 A1 | 2/2012 |

OTHER PUBLICATIONS

Alcatel-Lucent et al., "Rank 2 transmission for UL MIMO," $3^{rd}$ Generation Partnership Project (3GPP), 3GPP TSG-RAN WG1 Meeting #68bis, R1-121221, pp. 1-2, XP050599517, Jeju, South Korea, Mar. 26-30, 2012.

(Continued)

*Primary Examiner* — Adolf Dsouza
(74) *Attorney, Agent, or Firm* — Fay Sharpe LLP

(57) ABSTRACT

A method for supporting multiple-input-multiple-output communications, user equipment and a computer program product are disclosed. The method comprises the steps of: determining whether an amount of data available for transmission that is greater than a maximum capacity of one the plurality of streams is below an associated threshold amount of at least another of the plurality of streams; and if so, preventing transmission of at least one of the plurality of streams. This helps to ensure that a stream is only used for transmission when the residual data is sufficient to warrant its use.

16 Claims, 1 Drawing Sheet

(56) References Cited

OTHER PUBLICATIONS

"$3^{rd}$ Generation Partnership Project; Technical Specification Group Radio Access Network; Physical channels and mapping of transport channels onto physical channels (FDD) (Release 11)," 3GPP TS 25.211, V11.0.0, pp. 1-60, XP050555012, (Dec. 2011).

Alcatel-Lucent et al., "Rank selection in UL MIMO," $3^{rd}$ Generation Partnership Project (3GPP), 3GPP TSG-RAN WG1 Meeting #69, R1-122461, pp. 1-3, XP050601037, Prague, Czech Republic, May 21-25, 2012.

International Search Report for PCT/EP2013/000667 dated Apr. 24, 2013.

MULTIPLE-INPUT-MULTIPLE-OUTPUT (MIMO) COMMUNICATION

FIELD OF THE INVENTION

The present invention relates to a method for supporting multiple-input-multiple-output communications, user equipment and a computer program product.

BACKGROUND

Wireless telecommunications networks are known. Base stations in such networks provide wireless connectivity to user equipment within a geographical area or cell, associated with the base station. The wireless communication links between the base station and each of the user equipment typically include one or more downlink (or forward) channels for transmitting information from the base station to the user equipment and one or more uplink (or reverse) channels for transmitting information from the user equipment to the base station.

Multiple-input-multiple-output (MIMO) techniques may be employed when the base station and the user equipment include multiple antennas. For example, user equipment that includes multiple antennas can transmit multiple independent and distinct signals to base stations on the same a frequency, using the same code and within the same transmission time interval (TTI) which can be resolved by the base station(s). For example, individual user equipment is able to transmit two streams of data on an Enhanced Dedicated Channel (E-DCH) in the uplink using the same uplink resource (frequency, time and code) which means that the user equipment is capable of performing a rank two transmission (as opposed to a rank one transmission which occurs with when transmitting a single E-DCH stream).

The E-DCH consists of one or more E-DCH Dedicated Physical Data Channels (E-DPDCH) and is accompanied by one E-DCH Dedicated Physical Control Channel (E-DPCCH). The E-DPDCH carries the data traffic and the E-DPCCH carries control information to enable the E-DPDCH to be decoded.

In uplink MIMO, a secondary E-DCH stream is sent together with the primary E-DCH stream. Similar to the primary E-DCH stream, the secondary E-DCH stream consists of one or more secondary E-DPDCH (S-E-DPDCH) and one secondary E-DPCCH (S-E-DPCCH).

Although providing uplink MIMO facilitates transmissions from the user equipment to the network, unexpected consequences can occur.

Accordingly, it is desired to provide an improved technique for supporting MIMO communications.

SUMMARY

According to a first aspect, a method of controlling a plurality of streams of a multiple-input-multiple-output wireless telecommunication network, the method comprising the steps of: determining whether an amount of data available for transmission that is greater than a maximum capacity of one the plurality of streams is below an associated threshold amount of at least another of the plurality of streams; and if so, preventing transmission of at least one of the plurality of streams.

The first aspect recognizes that a problem with existing MIMO techniques is that when data is available for transmission that exceeds the maximum capacity of one of the streams (i.e. there is more data waiting to be transmitted than can be carried by one of the streams), typically, another stream is created which also is configured to operate at the maximum capacity of the existing stream. Causing this residual data to be transmitted over a stream configured to operate at its maximum capacity is not efficient since although it is feasible to have a low coding rate so that the data can fit into the capacity offered, it is not efficient to transmit in such manner since this would result in excessive transmission power and high usage of code resource and cause inter-stream interference.

Accordingly, a method of controlling a plurality of streams of MIMO wireless telecommunications network is provided. The method may comprise the step of establishing or determining that amount of data available for transmission which exceeds or is greater than a maximum capacity of one of the streams. It is also established whether that amount of data is less than or below a threshold amount of another of the streams. When it is determined that the amount of excess or residual data is below the threshold, the method may also comprise preventing transmissions using one of the streams.

In other words, the amount of residual data that exceeds the maximum capacity of one of the streams is established. If that amount of data is below a threshold associated with another of the streams, then transmission using one stream is prevented. This helps to ensure that a stream is only used for transmission when the residual data is sufficient to warrant its use. This prevents, for example, inefficient use of a stream which may otherwise result in excessive transmission power, high usage of code resource and additional inter-stream interference.

In one embodiment, the at least one of the plurality of streams which is prevented is the another of the plurality. Accordingly, the stream with which the threshold is associated may be prevented from being used for transmission.

In one embodiment, the at least one of the plurality of streams which is prevented is other than the another of the plurality. Accordingly, another of the streams other than the stream with which the threshold is associated may be prevented from being used for transmission.

In one embodiment, the at least one of the plurality of streams is any of the plurality of streams. Accordingly, any one of the streams, including the stream whose maximum capacity has been exceeded may be prevented from being used.

In one embodiment, each of the plurality of streams has an associated threshold amount. Accordingly, each stream may have its own threshold.

In one embodiment, each of the plurality of streams is configurable to support data transmission with a plurality of different data capacities, including a default data capacity and lower data capacities, and wherein the associated threshold amount comprises one of the lower capacities. Accordingly, each stream may be operated with different capacities. One of the capacities may be a default capacity and one or more capacities which are less than the default capacity may be provided. The threshold may be one of those lower capacities.

In one embodiment, the associated threshold amount comprises a lower capacity which is closest to the default capacity. Accordingly, the lower capacity which is nearest to the default capacity may be set as the threshold.

In one embodiment, the default capacity is a maximum capacity. Accordingly, the default may be the maximum possible capacity at which the stream may operate.

In one embodiment, the method comprises the step of receiving an indication of each threshold. Accordingly, an indication of each of the thresholds may associated with each stream may be received.

In one embodiment, each of the plurality of different data capacities is associated with a corresponding one of a plurality of different spreading code configurations for data transmissions over the stream. Accordingly, each of the different capacities may be achieved by operating the streams using different code configurations.

In one embodiment, the method comprises the step of receiving an indication of spreading code configuration which is associated with each threshold.

In one embodiment, the threshold comprises a maximum data capacity associated with the spreading code configuration.

In one embodiment, the plurality of streams comprise a primary stream and at least one secondary stream, and the step of determining comprises determining whether the amount of data for transmission over at least one secondary stream would fail to achieve the threshold amount.

According to a second aspect, there is provided a computer program product operable, when executed on a computer, to perform the method steps of the first aspect.

According to a third aspect, there is provided user equipment operable to control a plurality of streams of a multiple-input-multiple-output wireless telecommunication network, the user equipment comprising: determination logic operable to determine whether an amount of data available for transmission that is greater than a maximum capacity of one the plurality of streams is below an associated threshold amount of at least another of the plurality of streams; and transmission logic operable, in response to the determination logic determining that the amount of data available for transmission is below the associated threshold amount, to prevent transmission of at least one of the plurality of streams.

In one embodiment, the at least one of the plurality of streams which is prevented is the another of the plurality.

In one embodiment, the at least one of the plurality of streams which is prevented is other than the another of the plurality.

In one embodiment, the at least one of the plurality of streams is any of the plurality of streams.

In one embodiment, each of the plurality of streams has an associated threshold amount.

In one embodiment, each of the plurality of streams is configurable to support data transmission with a plurality of different data capacities, including a default data capacity and lower data capacities, and wherein the associated threshold amount comprises one of the lower capacities.

In one embodiment, the associated threshold amount comprises a lower capacity which is closest to the default capacity.

In one embodiment, the default capacity is a maximum capacity.

In one embodiment, the user equipment comprises reception logic operable to receive an indication of each threshold.

In one embodiment, each of the plurality of different data capacities is associated with a corresponding one of a plurality of different spreading code configurations for data transmissions over the stream.

In one embodiment, the user equipment comprises reception logic operable to receive an indication of spreading code configuration which is associated with each threshold.

In one embodiment, the threshold comprises a maximum data capacity associated with the spreading code configuration.

In one embodiment, the plurality of streams comprise a primary stream and at least one secondary stream, and the determining logic is operable to determine whether the amount of data for transmission over at least one secondary stream would fail to achieve the threshold amount.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
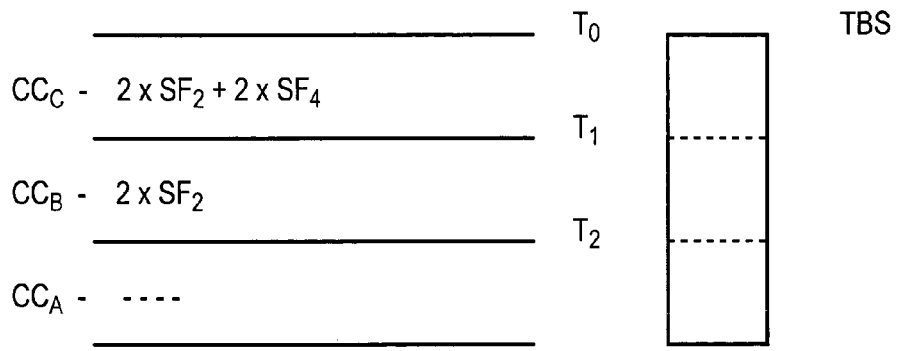
FIG. 1 illustrates a relationship between code configuration and stream capacity thresholds.

Before discussing the embodiments in any more detail, first an overview will be provided. As mentioned above, when using MIMO, it is possible to transmit multiple streams using the same resources (such as frequency, time and code). This gives different "rank" transmission types. For example, a single transmissions stream is known as a "rank one" transmission, whereas transmitting with two, three or four streams are known as rank "two", "three" or "four" transmissions, respectively. It will be appreciated that more than four streams may be provided.

The amount of data that can be carried by the different streams (their capacity) can differ. The amount of data carried is referred to as the "transport block size" for that stream. In order to change a capacity of a stream, different code configurations may be utilised. In particular, as the amount of data to be transmitted over a stream increases, the code configuration of that stream will be changed to increase the capacity of that stream until a maximum capacity for that stream is reached.

When no more code configurations can be selected to increase the capacity of a stream, other streams may be added. Typically, in order to simplify the management of the streams, any added streams will also be configured with the code configuration which enables the maximum amount of data also to be transmitted over an additional stream.

When a transmitter has a full buffer, the streams can be filled up to their maximum capacities (for example, the largest transport block size that can be carried by each stream). However, when the transmitter is "buffer limited", meaning that the buffer within the transmitter is not full, it is possible that the amount of data that can be carried by the streams is greater than the amount of data in the transmitter's buffer (i.e. the capacity of the stream is greater than the amount of data available for transmission). In these circumstances, at least one of the streams will not be utilized for transmissions and so transmissions occur with a lower rank.

In particular, in a buffer limited scenario, the capacity offered by an additional stream may be higher than the amount of data available within the transmitter's buffer for transmission within a stream. If the amount of data to be transmitted is still above a threshold amount which would require that stream to transmit data with the code configuration which provides that stream with the highest capacity, then transmission of the available data over that stream can continue to occur. However, if the amount of available data within the transmitter's buffer is less than this threshold amount (meaning that the data could be transmitted using a code configuration which provides for a lower capacity within the stream), then transmission using one of those streams is prevented to reduce the rank of transmissions. It will be appreciated that transmission using any one or more streams may be prevented.

Accordingly, it can be seen that this technique allows the data to be split between the streams in multiple rank transmissions and also provides a criterion by which the user equipment shall fall back to a lower rank.

As mentioned above, in uplink (UL) MIMO operation, the secondary E-DCH stream consists of at least one S-E-DPDCH (Secondary E-DPDCH), supported by an S-E-DPCCH (Secondary E-DPCCH). The S-E-DPCCH is sent using primary precoding vectors (i.e. via the primary stream) whilst the S-E-DPDCHs are sent using secondary precoding vectors (i.e. via the secondary stream). The S-E-DPCCH contains decoding information for the S-E-DPDCHs.

The amount of data that can be carried by the primary stream and the secondary stream can be different, i.e. the primary stream usually carries a larger transport block size (TBS) compared to that of the secondary stream. This is because the secondary stream usually has a weaker radio condition compared to that of the primary stream. For user equipment with a full buffer, the primary and secondary streams can be filled up to their respective maximum capacities (i.e. largest TBS that can be carried by each stream). In this case, the maximum capacity of the stream is determined by the total amount of Serving Grant (SG) that the UE is given.

However, when the UE is buffer limited, it is possible that the amount of data that can be carried by both streams is larger than the amount of data in the UE buffer. That is the amount of serving grant can carry more data than the data available at the user equipment's buffer.

Stream Characteristics

FIG. 1 illustrates a relationship between code configuration and stream capacity thresholds. For example, a first code configuration $CC_A$ provides a capacity within the stream to transmit a transport block size up to a threshold amount $T_2$ (which represents the maximum capacity of the stream when using that code configuration and so the maximum transport block size that can be transmitted over that stream using that code configuration is $T_2$). Using the code configuration $CC_B$ increases the capacity of the stream up to a threshold $T_1$. Accordingly, the maximum transport block size when using the code configuration $CC_B$ is $T_1$. Using the code configuration $CC_C$ increases the capacity of the stream to $T_0$. Hence, the maximum transport block size transmittable by the stream using that code configuration is $T_0$.

In this example, $T_0$ represents the absolute maximum capacity of the stream and is the maximum possible transport blocks size that can be transmitted within that stream. This means that any available data within the buffer which is greater than the maximum amount $T_0$ cannot be transmitted within the stream during a transmission period. Hence, this residual data must either be transmitted in a subsequent period or be transmitted by another stream.

As mentioned above, typically other streams will also be established by default using the code configuration which provides the greatest capacity within that stream. If the amount of residual data to be transmitted within that additional stream exceeds the threshold $T_1$, then that residual data can only be transmitted using the code configuration $CC_A$, which generally aligns with the default code configuration of that additional stream.

However, if the amount of residual data is less than the threshold $T_1$ (meaning that the transport block size of that additional stream is below $T_1$), then this means that the residual data could be transmitted using a different code configuration.

As can be seen in FIG. 1, the threshold $T_0$ is the maximum and typically the default capacity of the stream. The thresholds $T_1$ and $T_2$ are thresholds associated with lower capacities. In this example, the threshold $T_1$ would be the threshold of a lower capacity which is closest to the default capacity $T_0$.

It should be noted that a stream may be able to carry different data capacities other than those corresponding to the maximum capacities associated with a code configuration. For example, a first code configuration may carry any amount of data between the maximum capacity of the next lower code configuration and the maximum capacity of the first code configuration. The intermediate data capacities of the first code configuration are realised by means of different coding rates, whereby a lower code rate is used for transmission of an amount of data which is less than the maximum capacity of the first code configuration. When considering the "lower capacity which is closest to the default capacity" of a code configuration, these intermediate data capacities achieved by means of lower coding rates are not considered; instead we refer to the maximum capacity of the next lower code configuration.

Figure 2:
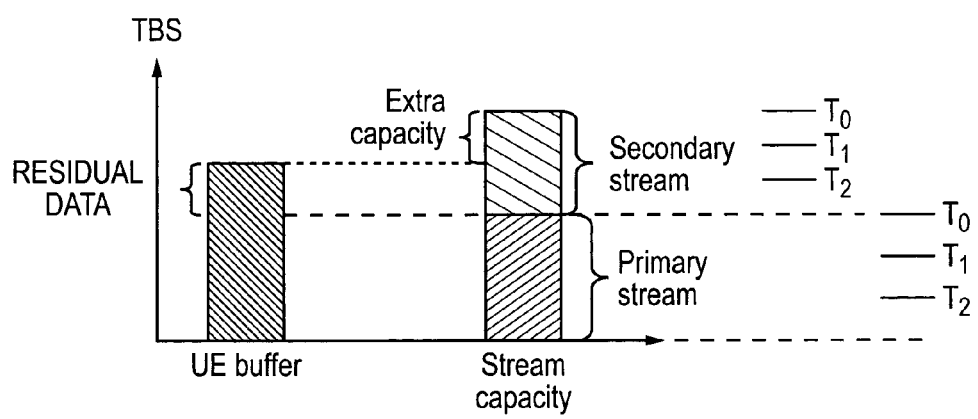
FIG. 2 illustrates a relationship between buffer occupancy and stream capacity.

As illustrated in FIG. 2, in embodiments, when the residual data for transmission within the additional stream is lower than the closest lower capacity to the default capacity (i.e. lower than $T_1$ in this example), a decision is taken not to transmit the residual data is using the additional stream since it is not efficient to do so. Instead, one of the streams is not utilized and the residual data is then stored in the transmission buffer for subsequent transmission.

EXAMPLE 1

With HSUPA uplink MIMO, rank 2 transmissions are only allowed if both streams are able to achieve the highest capacity code configuration of 2×SF2+2×SF4. The particular code configuration that user equipment can actually transmit depends on its radio condition and the amount of uplink resource (the serving grant and transmit power headroom).

This embodiment reduces the rank by 1 when the amount of data carried by any of the streams (for example the transport block size) can be supported by a code configuration which provides a lower capacity than a predefined or default code configuration for that stream (which is typically 2×SF2+2×SF4).

Under the buffer limited scenario, the stream capacity offered by the 2×SF2+2×SF4 code configuration can be much higher than the amount of data available for transmission within the stream. Although it is feasible to have a low coding rate such that the amount of data in each stream can fit into the capacity provided by the code configuration of 2×SF2+2×SF4, it is not efficient to transmit data in this manner since it would result in excessive transmission power, high usage of code resource and will cause inter-stream interference.

Each slot format and code configuration has the capacity to carry a maximum number of information bits and therefore has the capacity to support a maximum transmission block size for that code configuration. As mentioned above, changing the code configuration changes the data capacity of the stream. For example, the code configuration of 2×SF to using 2 E-DPDCH of slot format 7 (specified in 3GPP TS 25.211) has a maximum capacity of 7680 information bits. The next code configuration is 2×SF2+2×SF4 using 2 E-DPDCH of slot format 7 and 2 E-DPDCH of slot format 6, which has a maximum capacity of 11520 information bits.

$D_1$ and $D_2$ are the amounts of data that are to be carried by the primary and secondary streams respectively. If $D_1$ is less than or equal to 7680 information bits or if $D_2$ is less than or equal to 7680 information bits, then it is more code efficient to use a lower code configuration (such as 2×SF2) than to carry $D_1$ or $D_2$ using 2×SF2+2×SF4. Hence, if $D_1$ or $D_2$ can be carried by a lower code configuration than 2×SF2+2×SF4, then the user equipment falls back to a rank 1 transmission.

It will be appreciated that this approach can also be utilized for transmissions with a higher rank than two. For example, if the radio condition and uplink resources allow the user equipment to transmit with rank 4, then, if after dividing the user equipment data among the stream results in any of the streams having data that can be supported by a lower code configuration that the code configuration required for rank 4 transmissions, then the user equipment drops to rank 3. This process may then be repeated until the user equipment is reduced to rank 1.

EXAMPLE 2

In this embodiment, the user equipment falls back from rank 2 to rank 1 if the amount of data carried by the secondary stream can be supported by a code configuration lower than 2×SF2+2×SF4 (which is the default required code configuration for rank 2 transmission). Since the primary stream typically has a better radio condition, it is usually filled with a higher amount of data than the secondary stream. Therefore it is sufficient to check only relationship between the amount of data to be transmitted by the secondary stream and its thresholds.

In this embodiment, a buffer limited user equipment is allowed to transmit in rank 2 and has an amount of data in the buffer β=15000 bits. As described in more detail below, a parameter α is signaled to the user equipment which then derives the transport block size for the secondary stream from the transport block size of the primary stream. The secondary stream transport block size ($TBS_2$) is derived from the primary stream transport block size ($TBS_1$) as follows:

$$TBS_2 = \alpha TBS_1 \quad \text{Equation 1}$$

In this example α=0.7. Therefore, the amount of data in the user equipment buffer can be split according to α as follows:

$$TBS_1 = \frac{\beta}{1+\alpha} \quad \text{Equation 2}$$

The capacity of a stream is defined as the maximum transport block size that can be carried by that stream based on the UE radio condition and uplink resources. In this example, the capacities of the primary and secondary streams are shown in Table 1.

TABLE 1

Amount of data (bits) carried by each stream (i.e. TBS1 and TBS2)

| Stream | TBS Carried (bits) |
|---|---|
| Primary ($TBS_1$) | 8824 |
| Secondary ($TBS_2$) | 6176 |
| Total | 15000 |

The code configuration below 2×SF2+2×SF4 is 2×SF2 using slot format 7, which can carry a maximum of 7680 information bits. Hence, primary stream cannot use 2×SF2 to carry the data and therefore requires the 2×SF2+2×SF4 code configuration. However, the secondary stream can be carried using 2×SF2 codes. Accordingly, the user equipment falls back to rank 1.

EXAMPLE 3

In this embodiment, the user equipment has an amount of data in the buffer β=18000 information bits and α=0.9. Using Equations 1 and 2, the data carried by each stream is shown in Table 2.

TABLE 2

Amount of data (bits) carried by each stream (i.e. TBS1 and TBS2)

| Stream | TBS Carried (bits) |
|---|---|
| Primary ($TBS_1$) | 9474 |
| Secondary ($TBS_2$) | 8526 |
| Total | 18000 |

As described in Example 2, the code configuration below 2×SF2+2×SF4 is 2×SF2 and it can carry a maximum of 7680 information bits. Hence, in Example 3, both the primary and secondary streams require the 2×SF2+2×SF4 code configuration to carry its data. The user equipment therefore transmits in rank 2.

Transport Block Size Signalling

The general approach of embodiments is to use a different function to derive the transport block size $TBS_2$ for the secondary stream from the grant for the secondary stream, than the function used to derive the transport block size $TBS_1$ for the primary stream from the grant for the primary stream. Typically, at least the grant for the primary stream is signalled to the user equipment by the base station, and the grant for the secondary stream is either signalled or derived deterministically by the user equipment according to a predefined rule. From this grant, a transport block size for at least the secondary stream is derived.

As an example, consider a case where the primary stream's transport block size $TBS_1$ is a function $f_1$ of the grant $G_1$ (E-DPDCH:DPCCH power ratio) used for transmission in the primary stream, i.e.:

$$TBS_1 = f_1(G_1) \quad \text{Equation 3}$$

Currently, the function $f_1$ is implemented as a look-up table defined by 3GPP TS25.321, although it will be appreciated that the function $f_1$ may be implemented as a relationship, mapping or function.

The grant $G_1$ is the power ratio of the E-DPDCHs to the DPCCH (pilot power).

In general approach of embodiments, a separate function is used to derive the transport block size $TBS_2$ for the secondary stream from the grant for the secondary stream, i.e.:

$$TBS_2 = f_2(G_2) \qquad \text{Equation 4}$$

where $G_2$ is the grant provided for transmission in the secondary stream.

As described above, $G_2$ can be the power ratio of S-E-DPDCHs to DPCCH or the power ratio of S-E-DPDCHs to S-DPCCH, and since the power of E-DPDCHs and S-E-DPDCHs are typically assumed to be the same, $G_2$ is always equal or greater than $G_1$.

If the existing function $f_1$ is used on the secondary stream (with $G_2$ as the input), this will result in $TBS_2 \geq TBS_1$, i.e., the secondary stream (which has a weaker radio condition) has to support a larger transport block size than that in the primary stream. However, by using a separate function $f_2$ to derive the secondary stream transport block size, it allows $G_2$ (which can be $\geq G_1$) to map to a smaller transport block size compared to that in the primary stream, so as to be better matched to the reception quality of the secondary stream.

EXAMPLE A1

Function Scaling Factor

In one embodiment the function $f_2$ is equal to function $f_1$ multiplied by a scaling factor $\alpha$, i.e.:

$$TBS_2 = f_2(G_2) = \alpha f_1(G_2) \qquad \text{Equation 5}$$

This embodiment allows the same lookup table used in $f_1$ to be reused to derive $TBS_2$. Advantageously, the value of $\alpha$ is signalled by the network and can be semi-static or dynamic.

It should be noted that $TBS_2$ derived using Equation 5 may not be a valid transport block size since the E-TFCIs indexes to a specific set of discrete transport block sizes. Therefore the calculated $TBS_2$ may need to be "rounded" to a valid transport block size, for example rounded down to the next lower valid transport block size.

Embodiment A2—Grant Scaling Factor

In one embodiment, the function $f_2$ is equal to $f_1$ but with the grant $G_2$ scaled by a scaling factor $\alpha$, i.e.:

$$TBS_2 = f_2(G_2) = f_1(\alpha G_2) \qquad \text{Equation 4}$$

This embodiment reuses function $f_1$ and since function $f_1$ maps to a valid transport block size, the calculated $TBS_2$ will be a valid transport block size.

It is expected that the secondary stream is weaker than that of the primary stream and therefore a suitable value of $\alpha$ in Equations 5 or 6 would be <1.

Embodiment A3—Index Offset

The E-TFCI is the index to the transport block size lookup table. The transport block size lookup table (defined in 3GPP TS25.321) increases as the E-TFCI increases and there is a one to one mapping between E-TFCI and transport block size. Hence the function $f_1$ also gives the E-TFCI number. To avoid confusion, a function $h_1$ is defined that takes the grant $G_1$ and gives $ETFCI_1$ (E-TFCI for primary stream) as follows:

$$ETFCI_1 = h_1(G_1) \qquad \text{Equation 7}$$

In one embodiment, the E-TFCI for the secondary stream $ETFCI_2$, is an offset $\gamma$ (an integer) from the E-TFCI calculated using function $h_1$, i.e.:

$$ETFCI_2 = \max(h_1(G_2) - \gamma, ETFCI_{MIN}) \qquad \text{Equation 8}$$

where $ETFCI_{MIN}$ is the minimum valid E-TFCI in the transport block size lookup table. Since the E-TFCI points to a valid transport block size, the $ETFCI_2$ derived from Equation 8 would point to a valid transport block size. The existing transport block size lookup table used by the primary stream can therefore be reused. Similar to $\alpha$, $\gamma$ can be signalled by the network and can be semi-static or dynamic.

Hence, it can be seen that this approach allows data to be split between the streams in a rank N transmission and also provides a criteria by which the user equipment should fall back to a rank N−1 transmission.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling a plurality of streams of a multiple-input-multiple-output wireless telecommunication network, said method comprising:
   determining whether an amount of data available for transmission that is greater than a maximum capacity of one of said plurality of streams is below a threshold capacity of at least another of said plurality of streams; and
   if so, reducing a rank of transmission by preventing transmission of at least one of said plurality of streams;
   wherein the rank of transmission is reduced by 1 when an amount of data carried by any of the streams is supportable by a code configuration which provides a lower capacity than a maximum capacity code configuration for that stream.

2. The method of claim 1, wherein said at least one of said plurality of streams which is prevented is said another of said plurality.

3. The method of claim 1, wherein said at least one of said plurality of streams which is prevented is other than said another of said plurality.

4. The method of claim 1, wherein said at least one of said plurality of streams is any of said plurality of streams.

5. The method of claim 1, wherein each of said plurality of streams has a respective threshold capacity.

6. The method of claim 1, wherein each of said plurality of streams is configurable to support data transmission with a plurality of different data capacities, including a default data capacity and lower data capacities, and wherein said threshold capacity is one of said lower capacities.

7. The method of claim 6, wherein said threshold capacity is a lower capacity which is closest to said default capacity.

8. The method of claim 6, wherein said default capacity is a maximum capacity.

9. The method of claim 1, comprising receiving an indication of each threshold capacity.

10. The method of claim 6, wherein each of said plurality of different data capacities is achieved using a corresponding one of a plurality of different spreading code configurations for data transmissions over said streams.

11. The method of claim 1, comprising receiving an indication of a spreading code configuration which achieves each threshold capacity.

12. The method of claim 1, wherein said threshold capacity is a maximum data capacity achieved using said spreading code configuration.

13. The method of claim 1, wherein said plurality of streams comprise a primary stream and at least one secondary stream, and said determining comprises determining whether said amount of data for transmission over at least one secondary stream would fail to achieve said threshold capacity.

14. A non-transitory computer readable medium storing a computer program, which when executed on a computer, performs the method of claim 1.

15. The method of claim 1, wherein said plurality of streams are two streams.

16. User equipment operable to control a plurality of streams of a multiple-input-multiple-output wireless telecommunication network, said user equipment comprising:
   determination logic operable to determine whether an amount of data available for transmission that is greater than a maximum capacity of one of said plurality of streams is below a threshold capacity of at least another of said plurality of streams; and
   transmission logic operable, in response to said determination logic determining that said amount of data available for transmission is below said threshold capacity, to reduce a rank of transmission by preventing transmission of at least one of said plurality of streams;
   wherein the rank of transmission is reduced by 1 when an amount of data carried by any of the streams is supportable by a code configuration which provides a lower capacity than a maximum capacity code configuration for that stream.

\* \* \* \* \*